(12) United States Patent
Underwood et al.

(10) Patent No.: US 7,054,034 B2
(45) Date of Patent: May 30, 2006

(54) PRINTING APPARATUS AND METHOD FOR GENERATING DIRECTION DEPENDENT COLOR MAP

(75) Inventors: John A. Underwood, Vancouver, WA (US); Pau Soler, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 925 days.

(21) Appl. No.: 09/984,939

(22) Filed: Oct. 31, 2001

(65) Prior Publication Data

US 2003/0081229 A1 May 1, 2003

(51) Int. Cl.
*H04N 1/60* (2006.01)
*B41J 2/205* (2006.01)
*B41J 29/38* (2006.01)

(52) U.S. Cl. .................. 358/1.9; 358/1.19; 347/15; 347/19; 347/77; 347/78; 399/15

(58) Field of Classification Search ................ 358/1.9; 347/43, 77, 15, 19, 78; 399/15
See application file for complete search history.

(56) References Cited

U.S. PATENT DOCUMENTS 6,474,779 B1 * 11/2002 Inui et al. ..................... 347/43

* cited by examiner

*Primary Examiner*—Douglas Q. Tran
*Assistant Examiner*—Peter Huntsinger

(57) ABSTRACT

In a printing system, a hue shift compensation method includes the steps of: printing in a first direction a first color having a first color composition; printing in a second direction a plurality of second colors having varying color compositions; measuring with a color sensor the first and second colors; selecting one of the second colors approximating the first color and having a second color composition; and storing data corresponding to the second color composition as direction dependent color map data for use in printing in the second direction.

27 Claims, 4 Drawing Sheets

PRINTING APPARATUS AND METHOD FOR GENERATING DIRECTION DEPENDENT COLOR MAP

TECHNICAL FIELD OF THE INVENTION

This invention relates to color printing, and more particularly, but not exclusively, to a method and apparatus for reducing color hue shift in bidirectional color inkjet printing.

BACKGROUND OF THE INVENTION

The art of inkjet printing technology is relatively well developed. Commercial products such as computer printers, graphics plotters, copiers, and facsimile machines employ inkjet technology for producing hard copy printed output. The basics of this technology are disclosed, for example, in various articles in the Hewlett-Packard Journal, Vol. 36, No. 5 (May 1985) Vol. 39, No. 4 (Aug. 1988) Vol. 39, No. 5 (Oct. 1988), Vol. 43, No. 4 (Aug. 1992) Vol. 43, No. 6 (Dec. 1992) and Vol. 45 No. 1 (Feb. 1994) editions. Inkjet devices are also described by W. J. Lloyd and H. T. Taub in Output Hardcopy Devices, chapter 13 (Ed. R. C. Durbeck and S. Sherr, Academic Press, San Diego, 1988).

With the increased popularity of inkjet printing comes the increased competition between manufacturers of inkjet printers. Currently, the most common distinguishing features between competitive inkjet printers are price, speed, and print quality. Today, most inkjet printer manufacturers sell a model of printer in each price range of inkjet printers ranging from low cost home and office printers to high-speed commercial printers. To be competitive within each price range, the printer manufacturer must supply a printer with a faster print speed and a better resultant print quality than his competitors'. With price at a consistent low among the competitive inkjet printer manufacturers, a fast print speed directly coupled to a superior resultant print quality is key to the consumer's selection.

In many systems, color is mapped between that viewed on the monitor or display in a RGB (Red, Green, Blue) format to that outputted by an inkjet printer in a CMY (Cyan, Magenta, Yellow) format. This color mapping is necessary to obtain the "true" colors the user expects based on the display of color on the monitor as the mixing of the three colors are different between RGB and CMY schemes. Other color mapping processes are required to map colors between other color schemes; for example, between an image source file containing CMYK data and the CMYK color space of the chosen printer. U.S. Pat. No. 5,704,021 to Smith et al., assigned to the same Assignee as the present invention, discloses the process of "color mapping" in color inkjet printers, and is incorporated by reference in its entirety. Color mapping provides the printer driver with the information defining the combination and amount of color ink droplets to be applied to get the requested color.

However, due to the fixed ordering of the color print cartridges in the printer carriage, the order in which the ink droplets are to be applied to the print medium is fixed, for a given direction of travel of the print carriage. For example, in an inkjet printer where the print cartridges are ordered CMY, when traversing from left to right, a combination of Cyan and Yellow will have to be ordered Yellow then Cyan. In the event the inkjet printer works in a bidirectional mode, when returning in the right to left direction, a combination of Cyan and Yellow will have to be ordered Cyan then Yellow. This typically creates a varying color between left to right passes and right to left passes of the print cartridges. This variation may produce an undesirable banding, or hue shift effect in the output, as is well understood in the art.

The fastest way to print a contiguous area of color with a scanning inkjet printhead is to sweep the printhead across the media in a first direction while firing ink droplets as prescribed by the color map from an array of nozzles, advance the media the height of the array of nozzles then sweep the printhead in a second, opposite direction firing ink droplets as before. This is known as single-pass, bidirectional printing. Single-pass because the printhead passes over each area of the page only one time. There is minimal or no overlap between adjacent printed rows. Bi-directional because drops are fired while the printhead is travelling in both the left to right direction and the returning right to left direction.

This technique is well known and successful for printing in monochrome. Workers skilled in this field have recognized, however, that for printing in color a hue shift, or more precisely a color hue shift, arises between printing left to right over right to left.

One solution to this problem has been to digress to single-pass unidirectional printing. In this case, everything is printed in a left to right order, thereby eliminating the directional related color hue shifts. A second solution to the problem is to resort to multi-pass bi-directional printing where the colors are overlayed in an averaging or blending scheme whereby the banding becomes less noticeable. Either of their two solutions compromise print speed to achieve highest print quality.

A third solution is disclosed in U.S. Pat. application Ser. No. 09/303249 to Ross, filed on Apr. 13, 1999 and assigned to the same Assignee as the present invention, which is entitled "Method of minimizing hue shifts in a single-pass, bi-directional inkjet printer using direction dependent color maps". This patent discloses a method of employing two separate color maps for use in bi-directional printing and is incorporated by reference in its entirety. One color map is used for printing when the printer carriage is moving in a left to right print direction and the second color map is used when the printer carriage is moving in a right to left print direction. The use of two color maps allows the quantity and placement of individual ink droplets to be adjusted, according to their order of application, to minimize the directional related color hue shift.

Although this solution gives rise to significant improvements over the prior art, there remains room for further refinement. One reason for this is that the suitability of the two color maps depends upon various criteria that are subject to change. For example, the ambient environmental conditions and characteristics of the printer and the media being used may each affect a viewer's perception of a color printed and thus the effectiveness of a given pair of color maps.

With the increasing use of inkjet printers for high quality color printing in the home and in the office, there is a need for a high speed, low cost, compact inkjet printer that produces a uniform high quality output. It would therefore be desirable to provide a method and apparatus which addresses the problems of the prior art.

SUMMARY OF THE INVENTION

According to one aspect of the present invention there is provided in a printing system, a hue shift compensation method comprising the steps of: printing in a first direction a first color having a first color composition; printing in a second direction a plurality of second colors having varying color compositions; measuring with a color sensor said first and second colors; selecting a said second color approximating said first color and having a second color composition; and, storing data corresponding to said second color composition as direction dependent color map data for use in printing in said second direction.

In a printing system that exhibits bi-directional color hue shift, a color of given colour composition which is susceptible to such hue shift will appear different when printed in the first direction to when printed in the second direction. Therefore, by printing a color of a specific color composition in the first direction and then printing a number of colors of differing color compositions in the second direction, it is possible to determine the particular colour composition of the second color which best approximates the first colour despite the effect of the hue shift. Preferably, a relatively large number of second colours of differing color compositions are printed. In this manner, an accurate color match may be found between one of the second colors and the first color. The color compositions of the first colour and the second color that best matches the first may then by stored for future use.

In use when it is desired to print a color corresponding to the first color, this may be achieved when printing in the first direction by using the color composition of the first color and when printing in the second direction by using the color composition of the second color that best matches the first. In this manner, the visible effects of hue shift may be minimized.

By carrying out the method of the invention on the printer system in question, it is possible to obtain accurate hue shift compensation since factors effecting hue shift which are specific to the printer system in question may be compensated for. Additionally, it is possible to implement the method of the present invention when required to compensate for specific changes in operating and ambient conditions; thus giving further benefits in performance relative to the prior art methods.

Preferably, the method is carries out using an ink jet device.

Preferably, the method is repeated for a number of first colors. By doing so, a model may be derived of how the hue shift varies with changes in the colors printed across the color space of the printer. In this manner, further hue shift compensations may be determined for further colors using standard interpolation techniques. Thus, by establishing the required hue shift compensation for a selected number of first colors, the required hue shift compensation may be generated for the entire color space of the printer device or a selected area thereof.

According to a further aspect of the present invention there is provided method of generating a direction dependent color map in an inkjet device comprising a color sensor, said device being arranged to print composite colors in a bidirectional printmode, said method comprising the steps of: printing a first composite color in a first direction; printing a plurality of second composite colors having varying color compositions in a second direction; measuring said first and second colors; selecting one of said second colors which approximates said first printed color; storing the color composition of said selected color as second color map data for use in printing in said second direction.

According to a further aspect of the present invention there is provided a printer device comprising a writing system arranged to print composite colors in a bi-directional printmode, the system being arranged to print a first color in a first print direction and a plurality of second colors having varying color compositions in a second print direction, the system being further arranged to store the data corresponding to the color composition of an identified second color approximating said first color as direction dependent color map data.

According to a further aspect of the present invention there is provided in an inkjet printer comprising a color sensor, a method of determining a first color printed under a first operating condition which perceptually approximates a second color printed under a second operating condition, comprising the steps of: printing said second color under said second condition and printing a plurality of first colors having varying ink compositions under said first condition; measuring the color of said plurality of first colors and said second color with said color sensor; storing the color composition of a said first color which perceptually approximates said second color.

The present invention also extends a computer program arranged to implement the method of the invention and to a storage medium or data carrier carrying a computer program arranged to implement the method of the invention.

For a better understanding of the invention and to show how the same may be carried into effect, there will now be described by way of example only, specific embodiments, methods and processes according to the present invention with reference to the accompanying drawings in which:

DETAILED DESCRIPTION OF THE PREFERRED EMBODIMENTS

There will now be described by way of example only the best mode contemplated by the inventors for carrying out the invention.

First Embodiment

Figure 1:
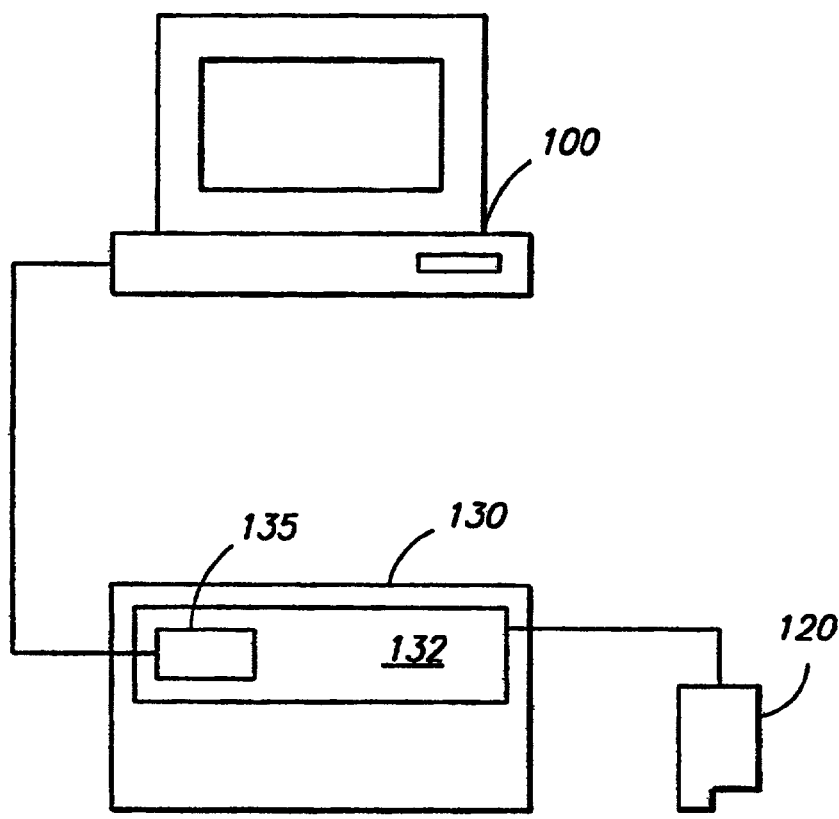
FIG. 1 is a schematic view of one form of an inkjet printing mechanism, here an inkjet printer, suitable for use with the present invention.

FIG. 1 is a schematic illustration of a computer controlled inkjet printing system in the preferred embodiment of the invention. The figure illustrates a computer 100, such as a conventional personal computer, which is connected to an inkjet printer 130 in a conventional manner. The inkjet printer 130 has a printer controller 132 that receives print commands from the computer 100. There is a printer memory 135 that supplies stored printing instructions, such as the method of selecting a print mode, to the printer controller 132. Printing is accomplished by traversing a printhead carriage (not shown) from side to side across the print media while ejecting droplets of ink from the printheads 120.

Typically commercially available color printers have a CMYK color space, and for the purposes of this example, CMYK will be used. However, the skilled reader will appreciate that the invention may be applied to printers having other color spaces; for example, CMYKcm or eight color type color spaces.

The preferred embodiment of the inkjet printer of the present invention, prints bi-directionally, so there is no time wasted on a non-printing carriage return. It also prints in a single-pass mode, so there is no time wasted on overlapping printing.

The printer controller 132 accesses two direction dependent color maps, stored in the printer memory 135 for printing respectively in the first and the return direction, as is described in U.S. Pat. application Ser. No. 09/303249 to Ross described above, which is hereby incorporated by reference in its entirety. Thus, the deposition of ink droplets forms composite colors, as prescribed by the two directionally dependent color maps, that compensate for the change of direction in a way that minimizes the visual color hue shift.

For the sake of completeness, one method of generating the two direction dependent color maps, which are generally created and loaded into the printer on manufacture, will now be described.

A series of color patches, otherwise known as a target, is printed whilst the print head 120 is moving in the first (left to right) printing direction. The colors making up the patches are generally selected so as to be an even sample of the available colors of the printer color space. That is to say, a representative sample of all of the colors in the printer's color space. However, the inventors of the present invention have realised that the addition of black ink K, reduces the perception of hue shift. Therefore, the hue shift problem is most evident when no black is used. Thus, in order to simplify the task of printing the target, as well as ensuring that the colors most prone to the hue shift problem are analysed, the color targets are generated using only Cyan (C), Magenta (M) and Yellow (Y) inks, in the present example.

In the present embodiment a 9×9×9 target is printed. That is to say that every possible color combination is printed using the C, M and Y inks, whilst the color range of each of the colors C, M and Y is represented by 9 discrete color levels. The minimum and maximum color levels for each color are respectively 0 and 255, and the intervening color levels are 223, 191, 159, 128, 96, 64 and 32. Thus, the number of possible color combinations is 729, the first 9 of which might be represented by the following CMY values.

|   | C   | M   | Y   |
|---|-----|-----|-----|
| 1 | 255 | 255 | 255 |
| 2 | 255 | 255 | 223 |
| 3 | 255 | 255 | 191 |
| 4 | 255 | 255 | 159 |
| 5 | 255 | 255 | 128 |

-continued

|   | C   | M   | Y  |
|---|-----|-----|----|
| 6 | 255 | 255 | 96 |
| 7 | 255 | 255 | 64 |
| 8 | 255 | 255 | 32 |
| 9 | 255 | 255 | 0  |

The process of printing a 9×9×9 target with the colors C, M and Y is then repeated in the same manner, using equivalent C, M and Y values, but printing in the reverse (right to left) printing direction.

Once the two direction dependent 9×9×9 targets have been printed, each color, or patch, in each of the targets is scanned. This may be carried out using a conventional spectrophotometer, the process of which is well understood in the art. The output of the spectrophotometer for each color of each target may be readily converted into a color of a given color system, such as CE L*a*b*.

Thus, a correspondence table may be generated relating CIE L*a*b* color values to the CMY values in each direction dependent target. Thus, this correspondence table effectively relates the perceived color of each patch in each of the two targets to the CMY value used to produce it. The skilled reader will appreciate that the number of points in the correspondence table between the CIE L*a*b* color values and the CMY values in each direction dependent target may be varied by printing targets with a greater or smaller number of color combinations. Alternatively, conventional interpolation techniques may be used to estimate a CMY value in the right to left or left to right printing direction for a given CIE L*a*b* color value.

As the skilled reader will appreciate, for a CMY color value that is susceptible to hue shift, the perceived color produced when it is printed in the first direction will be different to the perceived color produced when it is printed in the reverse direction. Consequently, these perceived colors will correspond to different CIE L*a*b* color values, despite having the same a CMY value.

Figure 2:
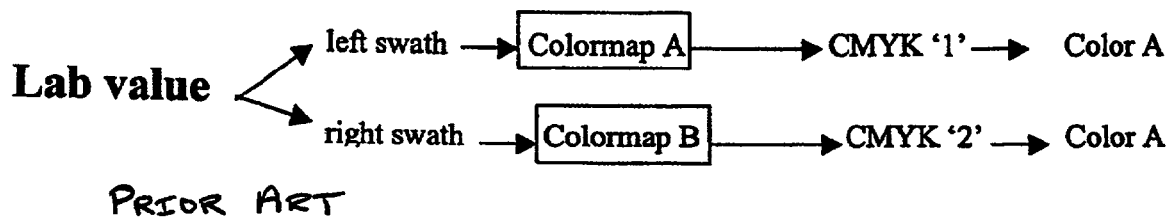
FIG. 2 schematically illustrates how separate color maps may be employed to reduce hue shift in bidirectional color inkjet printing.

Thus, for a given CIE L*a*b* color value, a first CMYK value "CMYK 1" may be obtained from a first color map, "color map A", in order to print the desired color "A", when printing in a first direction ("left swath"). The same color "A" may be printed in the reverse printing direction ("right swath"), by printing a second CMYK value "CMYK 2" obtained from a second color map, "color map B". This process is illustrated in FIG. 2.

It will also be appreciated by the skilled reader that the left to right color space and right to left color space of a given printer may not be wholly coincident. Therefore, it may be desirable to limit the usable color space of the printer to those color values which exist in both the left to right and the right to left color spaces of the printer; i.e. the intersection of the two color spaces.

As has been discussed above, the perceived color printed in either direction during a bi-directional printing job may vary between similar printers. Furthermore, for the same printer, the perceived color printed in either direction during a bi-directional printing job may vary if the environmental conditions change, or one or more pens of the printer are changed. This may also occur if the print media is changed. Therefore, from time to time, the user of a printer may wish to recalibrate or "fine tune" the direction dependent color maps used by the printer to reduce any hue shift that might be apparent. This may either be instigated by the user, using conventional user input controls, or may be instigated by the printer on detection of a change in print media, or one or more pens of the printer, or a change in environmental conditions that exceeds a given limit.

In the present embodiment, the user may select to calibrate the direction dependent color maps across the usable color space of the printer, or only to calibrate particular colors in the direction dependent color maps. The former approach may be particularly useful if the images to be printed contain a large number of colors. However, in the event that the printer is being used exclusively to print spot colors, it may be sufficient to match only the specific spot colors being used. As will be understood from the following description, the advantage with this approach is that the total calibration time may be reduced, whilst providing good bi-directional color consistency, between the limited range of spot colors which are required. In this case, there is no need to "adjust" the remaining CMY values of the remaining colors of the direction dependent color maps in order to compensate for the operational conditions.

The method of the present embodiment will now be explained with reference to FIGS. 3 to 6.

In the present embodiment, an image file is processed by the printer controller 132 to give rise to an output or print file for printing by the printer. In the example of the present embodiment the image file is in a CMYK format, such as SWOP™ CMYK format. However, the skilled reader will appreciate that other input formats may instead by used; for example sRGB format.

The process of correcting for hue shift in a spot color according to the present embodiment will now be described with reference to FIG. 3. In this example, the spot color in question is the secondary color green, composed of 100% cyan and 100% yellow.

A reference patch PR composed of 100% cyan and 100% yellow is printed in a first printing direction, "printing direction 1", as illustrated by the arrow in the figure. A row of seven "green" colored test patches $P_{T1}$–$P_{T7}$ are then printed in the reverse direction, "printing direction 2", as illustrated by the arrow in the figure. As can be seen from the figure, the percentages of cyan and yellow which have been used to print each of the patches in the row have been varied between 100%, 97.5% and 95%, to give all possible percentage combinations of cyan and yellow using these values.

The reference patch $P_R$ and the test patches $P_{T1}$–$P_{T7}$ are then each scanned in turn. In the present embodiment, this is carried out using a color sensor (otherwise known as a line sensor) mounted on the printer carriage of the printer. The line sensor may use three, colored LEDs, such as red, green and blue, which in turn illuminate the colors in each patch. The light reflected by each patch is detected by a photodiode. The signal output by the photodiode is a measure of the color content in the patch being measured corresponding to the color of the illuminating diode.

A description of this type of sensor arrangement may be found in U.S. Pat. application Ser. No. 09/627,509 filed Jul. 28, 2000, entitled "Techniques for measuring the position of marks on media and for aligning inkjet devices", which is assigned to the assignee of the present application, and is hereby incorporated by reference. Additional details of the function of a preferred optical sensor system and related printing system are disclosed in U.S. application Ser. No. 08/551, 022 filed Oct. 31, 1995 entitled "Optical path optimization for light transmission and reflection in a carriage-mounted inkjet printer sensor", which is assigned to the assignee of the present application, and is hereby incorporated by reference. However, the skilled reader will appreciate that any suitable, known sensor and method may be used for this purpose.

By repeating this measuring process for each colored LED, a CIE L*a*b* color value for the patch in question may be obtained using any suitable method. One such method is disclosed in U.S. Pat. application Ser. No. 09/919207 to Subirada, filed on Jul. 30, 2001, which is assigned to the same Assignee as the present invention and is entitled "Linearization of an incremental printer by measurements referred to a media independent sensor calibration". The contents of this application to Subirada are hereby incorporated by reference in their entirety.

The color value obtained from scanning the reference patch $P_R$ is then compared to those obtained for each of the test patches $P_{T1}$–$P_{T7}$. In this manner, it may be determined which of the test patches $P_{T1}$–$P_{T7}$ has a color that matches that of the reference patch $P_R$ most closely. As can be seen from the figure, in this example, the best match for the reference patch $P_R$ is the test patch $P_{T5}$, which is composed of 95% cyan and 100% yellow. The skilled reader will appreciate that if it is desired, this comparison step may be overridden by the operator of the system, in order to ensure that the best match, as determined by the human eye is used.

The cyan and yellow percentage values of the best matching patch $P_{T5}$ are then stored for subsequent use. The method used to store the corrected color map values may depend upon the system used. For example, the CMYK value of the best match test patch may simply be written over the value stored in the factory generated, second direction, direction dependent color map. Alternatively, the CMYK value of the best match test patch may be stored in a separate and possibly partial color map. However, in any event, when printing the color corresponding to the green comprising 100% cyan and 100% yellow printed in the first direction, the printer controller is arranged access the stored data corresponding to the best match composition of 95% cyan and 100% yellow, when printing in the reverse direction. Thus, using this method, the CMY values which need to be used when printing in the reverse direction, in order to match particular colors printed in the first direction, may be determined for a given set of operational conditions.

When printing a print job using a modified or corrected color value or color map, the printer controller 132 divides the image data of the print job into portions which are to be printed from left to right and portions which are to be printed from right to left in alternating swaths. This is carried out using a conventional swath processing technique. The first color map is applied in a conventional manner to left to right printing. The second corrected color map is applied in a conventional manner to right to left printing. The print job is then recombined by the printer controller 132 alternating left to right and right to left sweeps of the printhead operation. Finally, printer controller 132 moves the color-mapped data to the print file and the printing commences.

The skilled reader will also appreciate that in general, the more color variations that are printed in the test patches $P_{T1}$–$P_{T7}$, in a suitable color range about the color of the reference patch PR, the better will be the subsequent color match between the reference patch $P_R$ and the most similar of the test patches $P_{T1}$–$P_{T7}$. What constitutes a suitable color range about the color of the reference patch $P_R$ will depend upon various factors including the set up of the printer in question and ambient conditions and so may be determined using standard experimental techniques.

The number of color variations that are printed may be determined dependent upon the accuracy required, the speed of operation and other operational requirements. The skilled reader will also appreciate that the match may be made more accurate by interpolating between or extrapolating from color values of the test patches. This may be done in a conventional manner. Additionally, further test patches may be printed in the second direction with adjusted color values to fine tune this matching process, if no sufficiently close color match is found from among the first test patches $P_{T1}$–$P_{T7}$ to be printed.

As was mentioned above, in the event that the printer is being used exclusively to print spot colors, it may be sufficient to match only the specific spot colors being used. In this case, there is no need to "adjust" the remaining CMY values of the remaining colors of the direction dependent color maps in order to compensate for the operational conditions. However, if the images to be printed contain a wide range of colors, further correction may be required. In the present embodiment this may be achieved in the following manner.

Figure 4:
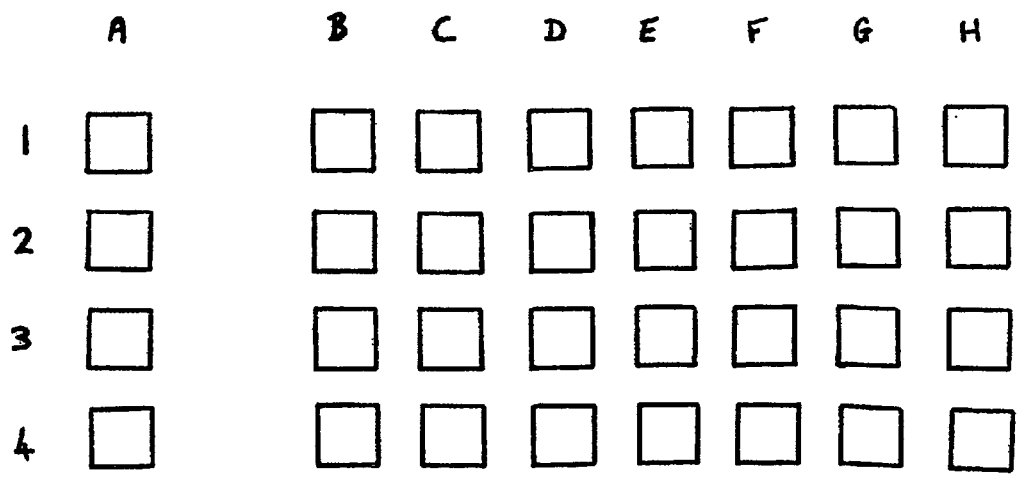
FIG. 4 illustrates color patches printed in first and second directions for matching the secondary and tertiary colors in the color correction process of an embodiment of the present invention.

The printer prints a test pattern made up of a series of reference and test patches, as illustrated in FIG. 4. The patches in the figure are ordered in a grid. For ease of reference the rows of the grid have been labelled from "1" to "4" and the columns from "a" to "h".

The column "a" is made up of four reference patches, which are printed in a given printing direction, in this example, from left to right. In the case of the present example, the reference patches in positions a1, a2 and a3 correspond respectively to the three possible secondary colors, when using a CMY color space. These are respectively red, green and blue, which are composed respectively of: magenta and yellow ink; cyan and yellow ink; and, cyan and magenta ink. The test patch in position a4 corresponds to the single possible tertiary color when using a CMY color space, composite black, which is composed of: cyan, magenta and yellow ink. For the reason explained above, no black ink is used in the printing of the reference or the test patches in this example.

The remaining columns, columns "b" through to "h" inclusive, are made up of test patches, each of which are printed the reverse direction relative to the reference patches; i.e. from right to left.

In the present example, each of the test patches in a given row has a color composition approximately equal to that of the reference patch in the same row. However, the exact color compositions of the patches in each row are chosen so as to vary around the color composition of the corresponding reference patch. This process is carried out in the same manner as was described with reference to the test patches $P_{T1}$–$P_{T7}$ illustrated in FIG. 3.

Figure 3:
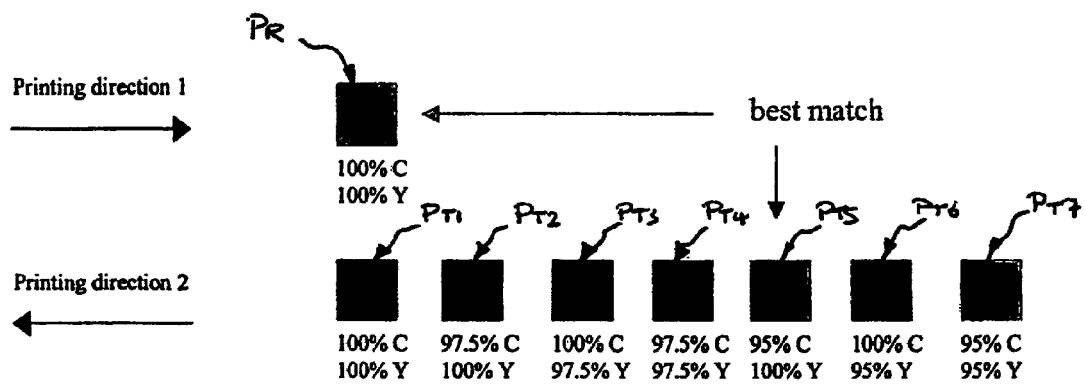
FIG. 3 illustrates color patches printed in first and second directions in the color correction process of an embodiment of the present invention.

In the present example, as was the case with the example given in FIG. 3, one test patch in each of the rows 1–14 is printed using the same CMY values as were used to print the reference patch or the same row. In this example, the test patches in each of the positions b1, b2, b3 and b4 were printed using the same CMY values as were used to print the reference patches a1, a2, a3 and a4, respectively.

The reference patch in position a1 is then scanned, as are the test patches in the same row, i.e. positions b1 to h1. This scanning process may be carried out in the same manner as described above with reference to FIG. 3. The measured color value for the reference patch in position a1 is then compared to the measured color values for each of the test patches in positions b1 to h1. In this manner, as was described above with reference to FIG. 3, the printer controller 132 determines which of the colors of the test patches in positions b1 to h1 best matches that of the reference patch in position a1. The color composition of the test patch best matching the reference patch is then stored.

This process is then repeated for each of the remaining reference patches in positions a2 to a4, and their associated test patches, in turn.

At the end of this process, the printer controller 132 has stored in the printer memory 135 the CMY color composition of the four secondary and tertiary colors. Also stored in the printer memory 135 is the CMY color composition of each of the colors printed in the right to left printing direction that were deemed to best match the four secondary and tertiary colors printed in the left to right direction, for the given printer and ambient conditions.

Figure 5:
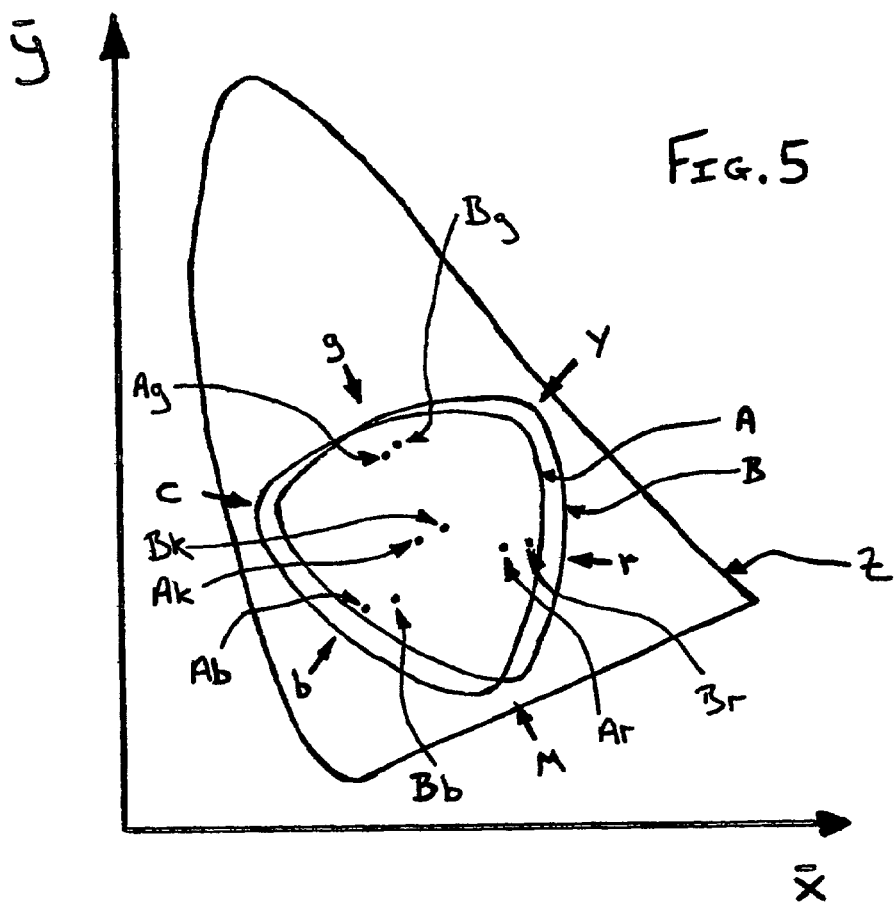
FIG. 5 shows a chromaticity diagram illustrating the color spaces for a printer according to an embodiment of the present invention when printing in a first and a second direction.
Figure 6:
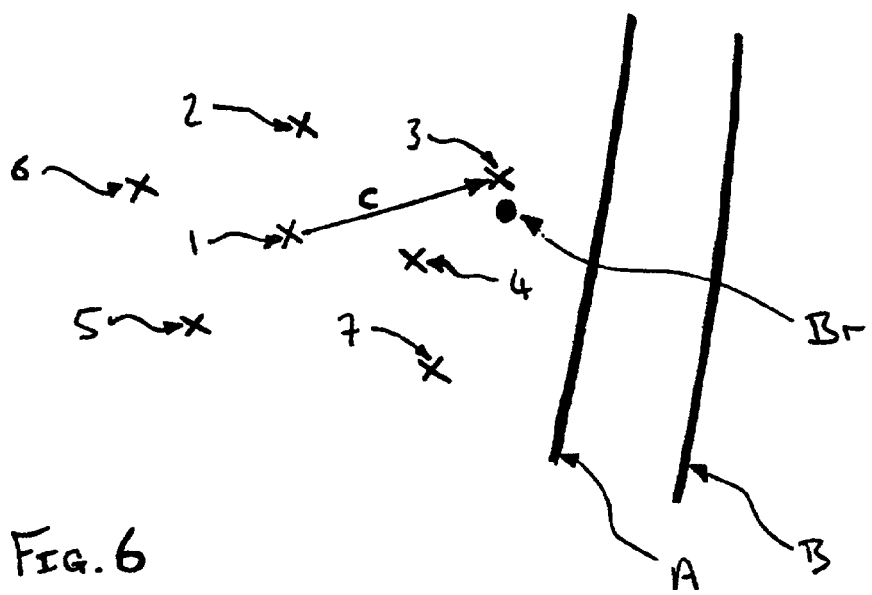
FIG. 6 shows an enlargement of a portion of FIG. 5 and illustrates the color correction process of an embodiment of the present invention.

This is illustrated graphically in FIGS. 5 and 6. FIG. 5 shows a conventional chromaticity diagram, which is a two dimensional representation of a three dimensional color space. Represented in the chromaticity diagram is the color space of the printer 130. As can be seen from the figure, the color space of the printer 130 is effectively made up of two color spaces. These color spaces are labelled "A" and "B", and each forms a subset of all of the observable colors, labelled "Z" in the figure. Color space "A" corresponds to the color space of the printer when printing in the right to left printing direction and color space "B" corresponds to the color space of the printer when printing in the left to right printing direction.

As can be seen from the figure, the two color spaces do not exactly coincide. This means that there are colors that form part of one color space which do not exist in the other color space. Thus, in practice it may be useful to limit the color space of the printer to the intersection of the two color spaces when printing bi-directionally, in order to ensure that only colors which can be represented in both printing directions are used.

For the purposes of correcting for hue shift in the present example, it is also useful to determine the degree of hue shift that is present in various areas of the color space of the printer using colors that feature in both of the color spaces A and B. This may be achieved by printing each of reference patches in positions a1 to a4 in FIG. 4 with reduced percentage of each ink of which they are composed. For example, instead of printing the green reference patch using 100% cyan and 100% yellow, 95% cyan and 95% yellow may instead be used. The inventors have found that using a percentage of 90 to 95, or less, of each of the component ink colors of the reference patches generally achieves this aim. However, the skilled reader will appreciate that the optimum percentage will depend upon variables including the specific printer and print medium being used, and so this may be determined experimentally.

By printing reference patches with reduced percentages of each ink of which they are composed, it may be ensured that the colors of the reference patches are not positioned at points which are close to the periphery of the printer's color space. Therefore, it is likely that they will be contained in both the right to left color space A and the left to right color space B of the printer. This ensures that it is possible to match the colors of the reference patches printing in one direction with test patches printed in the reverse direction.

For ease of explanation, the approximate positions of the primary and secondary colors in the color spaces "A" and "B" of the printer are indicated in the figure. These colors are: cyan; magenta, and yellow; and, red; green; and, blue. The positions of these colors are respectively indicated by arrows labelled with the letters: "C"; "M"; and, "Y"; and, "r"; "g"; and, "b".

Also shown in FIG. 5 are the positions of the CIE L*a*b* values of each of the reference patch colors of column "a", in FIG. 4. These colors are, respectively, red, green, blue and composite black and are labelled in the figure Br, Bg, Bb and Bk, respectively.

Also shown in FIG. 5 are positions of the CIE L*a*b* values of each of the test patches that have the same color compositions as the reference patch colors. These colors are, respectively, red, green, blue and composite black and are labelled in the figure Ar, Ag, Ab and Ak, respectively.

As can be seen from the figure, the color position of the test patch colors Ar, Ag, Ab and Ak are offset from the position of the reference patch colors Bg, Br, Bb and Bk; thus, indicating the presence of a printer direction dependent hue shift.

The process by which the positions of the test patch colors Ar, Ag, Ab and Ak relative to the reference patches of corresponding colors Br, Bg, Bb and Bk is determined will now be described with reference to FIG. 6.

FIG. 6 shows an enlargement of a portion of FIG. 5 centred on the red portion of the chromaticity diagram. The figure shows portions of the limits of the color spaces "A" and "B". The figure also shows the color position of the red reference patch a1, again labelled Br, as measured in the scanning operation using the color sensor of the printer. Also illustrated in the figure is the color position of each of the corresponding test patches b1 to h1; also as measured by the color sensor of the printer. In the figure, these points are each represented by an "X" and are labelled 1 to 7, respectively.

As can be seen from the figure, the position indicated by the point "X" labelled 3 is the closest position to the point Br of the red reference patch a1. Therefore, the color composition of the test patch d1, corresponding to the point "X" labelled 3, is deemed to be the best color match to it. The point "X" labelled 1 corresponds to the color position of the test patch b1. The test patch b1, as stated above, was printed using the same CMY values as was used to print the red reference patch a1. Thus, the difference in the color positions between the point "X" labelled 1 and the point Br represents the hue shift present when printing the CMY value of the reference patch a1 in both the left to right and the right to left printing directions.

The vector "C" in the figure represents the difference in the CMY value between that of the test patch b1 and the test patch d1. Assuming that the perceived color of the test patch d1 is a satisfactory equivalent to the perceived color of the reference patch a1, the vector "C" also represents the correction in CMY value which must be made to the CMY value of the test patch b1 when printing in the right to left direction, in order to match the perceived color produced when printing the CMY of value the reference patch a1 in the left to right direction.

As the test patch b1 and the reference patch a1 have identical CMY values, the vector "C" simply represents the CMY value correction which must be made to the CMY value of the reference patch a1, when printing in the right to left direction, in order that it should perceptually match the color of the CMY value of the reference patch a1 when printed in the left to right direction.

The skilled reader will appreciate that this correction may only be approximate if the color position of the point "X" labelled 3 is not exactly coincident with the point represented by the point Br, as is indeed the case in the figure. However, as has been described above, various measures may be taken to improve the match between the test patches and the corresponding reference patch, should this be required.

The same process is then repeated with respect to each of the reference patches and their associated test patches in turn. In this manner, for each reference patch CMY value, a CMY correction (or a correction vector) is generated, which allows the same perceived color to be printed in the reverse direction. Thus, hue shift may be significantly reduced or for practical purposes even eliminated when printing each of these colors.

The correction vector "C" in FIG. 6, representing the hue shift correction in the case of the red reference patch, may be represented in FIG. 5 by a vector (not shown) extending from the point Ar in the color space A to the point Br in the color space A. Similarly, the required hue shift correction in the case of the green, blue and composite black reference patches may respectively be represented by the further vectors (not shown) mapping points in the color space A to points in the color space B. Such vectors respectively extend from point Ag to Bg, and from point Ab to Bb and from point Ak to Bk.

From this information, a corresponding correction may be deduced for any color lying in both the color space A and the color space B. This may be achieved as follows. A given CMY value, hereafter referred to as value "1", may be located in the color space B in the chromaticity diagram. This may be located relative to known CMY values in the color space B; i.e. relative to the positions of the CMY values of two or more reference patches. As described above, the correction vectors associated with each of the two or more reference patches are known. Therefore, using standard interpolation techniques, the correction vector associated with the color represented by the position of CMY value "1" may be calculated. Although, the chromaticity diagram in FIG. 5 is a two dimensional representation, it represents a three-dimensional color space. Therefore, in the present example the interpolation is carried out in three dimensions.

In this example, it is explained how a color of given composition printed in one direction may be perceptually matched by a further color printed in a second direction. However, the skilled reader will appreciate that once the relationship between color composition and hue shift has been established for a given set of conditions, the relationship may be used to map colors in either direction. That is to say, it may also be used to find the composition of a color which when printed in the first direction perceptually matches a given color printed in the second direction.

In practice, the skilled reader will of course appreciate that by increasing the number of reference color patches and associated test patches, a better model may be arrived at for interpolation purposes. For example, 32 or more points in the color space of a first print direction of the printer device may be mapped onto matching colors in the color space of a second print direction of the printer device, to give significantly improved performance. Furthermore, the skilled reader will appreciate that the points chosen for mapping may be positioned in color and luminance areas of the printer color space which are most susceptible to hue shift and/or in color areas which are used most. For example, a reduced number of points, or no points, may be mapped in areas where little or no hue shift is normally perceived, such as areas with a high degree of black ink. In this manner, the cost in time and materials required to implement the process may be minimised for a given performance.

Therefore, the CMY value, value "2", that should be printed in the right to left direction to perceptually match the color produced by value "1" printed in the left to right direction is set equal to value "1" when modified by the correction vector calculated by interpolation. Value "2" is then stored in the right to left printing direction color map, as described above, for future use.

The skilled reader will appreciate that using this method, entire hue shift corrected color maps may be generated for a given set of operating conditions prior to the start of a print job. Alternatively, hue shift corrections may be derived require colors, from the reference and test patch data in real time, while processing the image data of a given print job.

Further Embodiments

In the embodiment described above, numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

For example, the skilled reader will appreciate that the "color pipeline" architecture used to process the different color maps may be varied.

Figure 7:
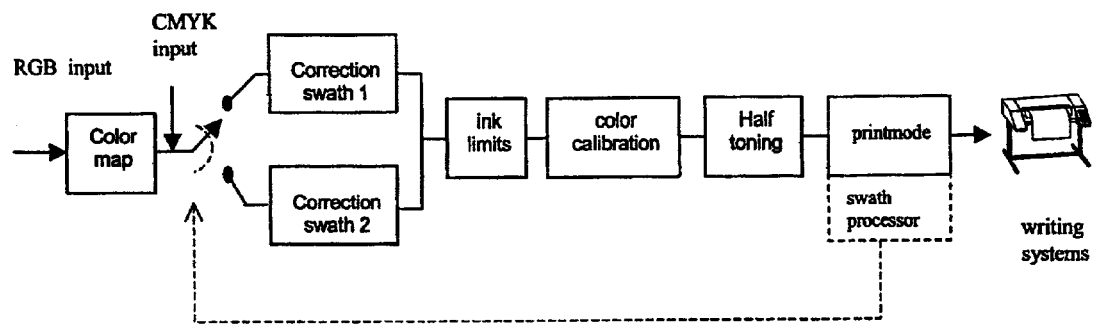
FIGS. 7, 8 and 9 illustrate exemplary color process architectures that may be employed with the present invention.

An alternative architecture is shown in FIG. 7. In this architecture, a single color map is used. However, two, parallel color map correction stages are incorporated into the system, one for correcting the color map associated with each print direction. In this architecture, the "fine tuning" of the color map data would generally cause changes or adjustments to be recorded in one or both of the color correction stages, as opposes to the single color map. The skilled reader will of course appreciate that either of these color map correction stages could in fact be the "identity"; i.e. leave the color map unmodified for a particular print direction. One advantage of this type of architecture is that both the RGB and the CMYK inputs are input prior to the correction stages and so both receive the same compensation according to the present invention.

As can be seen in the figure, after the color map correction stages, ink limiting, color calibration, halftoning, printmode, writing system and other stages, as are well known in the art of inkjet devices, may be incorporated. As can be seen from the figure, a swath processing stage is also incorporated, associated with the printmode stage, with feedback to the color map correction stages, to ensure that the correct color map is used for each swath.

Figure 8:
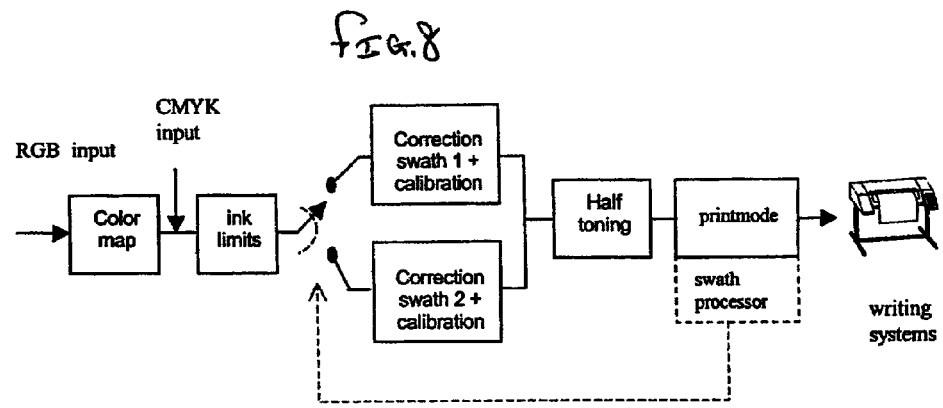

A further alternative architecture is shown in FIG. 8. In this architecture, a single color map, with two color map correction stages, is again used. However, in this architecture, the ink limiting and color calibration stages are incorporated into the color map correction stages. The advantage of this architecture is that the color calibration process is able to perform more complex processes since it is performed at the same time as the hue shift compensation.

Figure 9:
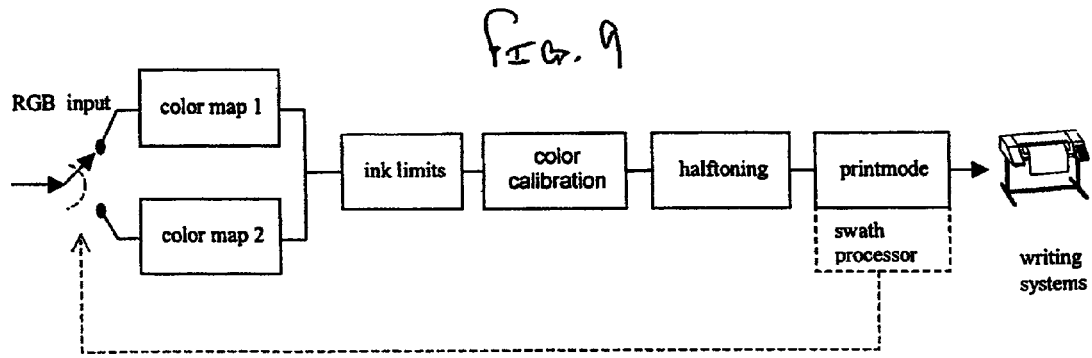

A further alternative architecture is shown in FIG. 9. This architecture has two color maps, one for use in printing in each print direction. As can be seen from the figure, this architecture has an RGB input but lacks a CMYK input. This architecture is thus suitable for many desktop printers, which often do not offer the possibility of using CMYK inputs.

Furthermore, although the above described embodiment prints in a single-pass mode, the skilled reader will appreciate that the present invention could also be applied with advantage to print modes having two or more passes.

Similarly, although the above-described embodiment was described as a method of recalibrating or changing two existing direction dependent color maps, the skilled reader will appreciate that the present invention is not limited to this embodiment. For example, it will be appreciated that the present invention could be implemented such that it is possible for an end user to generate a second, direction dependent color map, for use with a printer that previously had only one color map. The skilled reader will also appreciate that the method of the present invention may also be used to generate two direction dependent color maps ab initio.

Although in the above-described embodiment, the two direction dependent color maps were described as being stored in a memory associated with the printer and the process of accessing the two direction dependent color maps was described as being carried out in the printer, the skilled reader will appreciate that these processes may instead be carried out by an associated processor, for example in a personal computer.

The skilled reader will appreciate that several, separate and possibly partial color maps may be generated according to the present invention and stored in a memory associated with a printer or associated operating system. Each such color map may contain data defining the prevailing conditions and print set up in which the color map was generated. Preferably these should include the main factors affecting hue shift and may, for example, include: paper type; temperature; and humidity, amongst others. A color map may be selected from the number of color maps by comparing the data defining the prevailing conditions and print set up at the time of the color map was generated which match closest the conditions and print set up prevailing at the time of carrying out the print job. In this manner, a suitable pre-prepared direction dependent color map may be selected for use for use with a given print job, without incurring any significant time delay.

The skilled reader will also appreciate that the present invention may also be implemented to counter hue shift in a variety of circumstances which differ from those discussed in the above embodiment. For example, if a printer device is used to print the same image on a variety of print medias, an apparent change in the colors of the image may appear between the images printed on different medias. It may however be desirable or important that the colors appear consistent between the different medias. In this case, first color map data may be used or generated for printing in a first direction on first print media and second color map data may be generated for printing in the same direction on second print media. This may be carried out in the same manner as was described in the above-described embodiment. This may be sufficient hue shift compensation where unidirectional printing is used. However, if bi-directional printing is used, it may be desirable furthermore to generate color map data for printing in the reverse direction on both print medias. Thus, in this case, four separate sets of color map data may be required for printing on two media types.

Additionally, the colors printed by a printer may change with the operating temperature of the printheads. Thus, the method of the present invention may also be used in order to generate different color maps for use at different operating temperatures, in order that a given color appears the same irrespective of whether it was printed when the printhead was operating at a high or a low operating temperature, for example.

Furthermore, in the event that pens of a printer are changed, the colors printed by the printer may also change. Thus, in this situation as well, colors printed by different pens may be matched by using the method and apparatus of the present invention. Thus, the skilled reader will appreciate that the method of the present invention may be used to compensate for changes in a broad range of conditions in which a printer operates.

What is claimed is:

1. In a printing system, a hue shift compensation method comprising the steps of: printing in a first direction a first color having a first color composition;
   printing in a second direction a plurality of second colors having varying color compositions;
   measuring with a color sensor said first and second colors;
   selecting one of said second colors approximating said first color and having a second color composition; and
   storing data corresponding to said second color composition as direction dependent color map data for use in printing in said second direction.

2. A method according to claim 1, wherein said step of printing said first color further comprises the step of determining said first color composition from direction dependent color 15 map data for use in printing in said first direction.

3. A method according to claim 1, wherein the step of storing said second color map data comprises overwriting or modifying stored color map data for use in printing in said second direction.

4. A method according to claim 1, wherein the method is repeated for a plurality of first colors.

5. A method according to claim 4, wherein, the plurality of first colors comprises at least the secondary colors of said printing system.

6. A method according to claim 5, wherein the printer has a CMYK color space and the method is repeated for each of the colors red, green, blue and composite black.

7. A method according to claim 4, further comprising the step of determining a hue shift compensation for a third color, the step comprising the substeps of:
   determining the difference in color composition between said third color and each of a plurality of first colors;
   determining the difference in color composition between each of said first colors and said corresponding selected second color; and
   determining said hue shift compensation for said third color by interpolation.

8. A method according to claim 7, further comprising the step of repeating the substeps for a plurality of further third colors.

9. A method according to claim 1, wherein said first color is composed of one or more primary color printed at less than 100% coverage.

10. A method according to claim 1, further comprising selecting the composition of said first color to lie inside the color space of the printer when printing in the second print direction.

11. A method according to claim 1, wherein the step of selecting said second color approximating said first color is dependent upon an operator selection.

12. A method according to claim 1, further comprising the step of storing in a memory 20 associated with the system the prevailing printer set up and or ambient or environmental conditions when printing said first and second colors.

13. A method according to claim 12, further comprising the preliminary steps of:
   measuring the prevailing printer set up and or ambient or environmental conditions;
   searching in said memory for direction dependent color map data for use in printing in said second direction with associated printer set up and or ambient or environmental conditions corresponding to said measured conditions; and
   if found, reverting to said found color map data for subsequent printing.

14. A method according to claim 1, wherein said printing system comprises an inkjet device.

15. A method according to claim 14, wherein said inkjet device is an inkjet printer.

16. An inkjet device arranged to implement the method steps of claim 1.

17. One or more computer storage media comprising computer-executable instructions that when run on a processing device associated with suitable hardware perform the method of claim 1.

18. A method of generating a direction dependent color map in an inkjet device comprising a color sensor, said device being arranged to print composite colors in a bi-directional printmode, said method comprising the steps of:
   printing a first composite color in a first direction;
   printing a plurality of second composite colors having varying color compositions in a second direction;
   measuring said first and second composite colors;
   selecting one of said second composite colors which approximates said first composite color; and
   storing the color composition of said selected color as second color map data for use in printing in said second direction.

19. A printer device comprising:
   a writing system arranged to print composite colors in a bi-directional printmode, the system being arranged to print a first color in a first print direction and a plurality of second colors having varying color compositions in a second print direction, the system being further arranged to store the data corresponding to the color composition of an identified second color approximating said first color as direction dependent color map data;
   a first direction dependent color map data for use in printing in said first direction and second direction dependent color map data arranged for use in printing in said second direction; and
   a memory storing a first color map and first and second color map correction stages, said first and second color map correction stages being arranged to correct the color map data stored in said first color map when printing in first and second directions, respectively.

20. A device according to claim 19 further comprising a color sensor arranged to measure said first and second colors, the device being arranged to identify said identified second color in response to measurements of said color sensor.

21. A device according to claim 19, wherein said first or second color map correction stages comprise one or more algorithms arranged to operate on the color map data held in said first color map.

22. A device according to claim 19, wherein said first or second color map correction 15 stages comprise a plurality of difference values arranged to modify the color map data held in said first color map.

23. A device according to claim 19, wherein one of said first and second color map correction stages is the identity.

24. A device according to claim 23, wherein at least one of said first and second color map correction stages is combined with a color calibration function.

25. An inkjet printer comprising a writing system arranged to print composite colors in a bi-directional printmode and a color sensor, the system being arranged to print a first color in a first print direction and a plurality of second colors having varying color compositions in a second print direction, the system being further arranged to measure said first and said second colors with said color sensor and to select one of said second colors approximating said first color and to store said color composition of said selected second color in a direction dependent color map.

26. A printer system comprising a color sensor and arranged to print composite colors in a N-directional print-mode, said system being arranged to print a first color in a first print direction and a plurality of second colors having varying color compositions in a second print direction, the system being further arranged to measure said first and said second colors with said color sensor and to select one of said second colors approximating said first color and to store the color composition of said selected color in a direction dependent color map for printing in said second direction.

27. An inkjet system comprising a color sensor and a writing system arranged to print 10 composite colors using first and second color maps for printing in first and second print directions respectively, the system being arranged to:
   print a first color in said first direction and a plurality of second colon having varying color compositions in said second direction;
   measure said first and second colors;
   select a said second color approximating said first color; and
   store the composition of said selected color in said second color map as the color composition corresponding to said first color.

* * * * *

UNITED STATES PATENT AND TRADEMARK OFFICE
CERTIFICATE OF CORRECTION

PATENT NO. : 7,054,034 B2
APPLICATION NO. : 09/984939
DATED : May 30, 2006
INVENTOR(S) : John A. Underwood et al.

It is certified that error appears in the above-identified patent and that said Letters Patent is hereby corrected as shown below:

In column 6, line 20, delete "CE" and insert -- CIE --, therefor.

In column 8, line 59, delete "PR" and insert -- $P_R$ --, therefor.

In column 9, line 52, delete "1-14" and insert -- 1-4 --, therefor.

In column 15, line 21, in Claim 2, after "color" delete "15".

In column 15, line 59, in Claim 12, after "memory" delete "20".

In column 15, line 60, in Claim 12, delete "and or" and insert -- and/or --, therefor.

In column 15, line 64, in Claim 13, delete "and or" and insert -- and/or --, therefor.

In column 16, line 1, in Claim 13, delete "and or" and insert -- and/or --, therefor.

In column 16, line 48, in Claim 20, after "claim 19" insert -- , --.

In column 16, line 58, in Claim 22, after "correction" delete "15".

In column 16, line 59, in Claim 22, delete "difference" and insert -- different --, therefor.

In column 17, line 10, in Claim 26, delete "N-directional" and insert -- bi-directional --, therefor.

In column 18, line 4, in Claim 27, after "print" delete "10".

UNITED STATES PATENT AND TRADEMARK OFFICE
CERTIFICATE OF CORRECTION

PATENT NO.         : 7,054,034 B2
APPLICATION NO.    : 09/984939
DATED              : May 30, 2006
INVENTOR(S)        : John A. Underwood et al.

It is certified that error appears in the above-identified patent and that said Letters Patent is hereby corrected as shown below:

In column 18, line 8, in Claim 27, delete "colon" and insert -- colors --, therefor.

Signed and Sealed this

Seventeenth Day of March, 2009

JOHN DOLL
*Acting Director of the United States Patent and Trademark Office*